US012499750B2

(12) United States Patent
Yang et al.

(10) Patent No.: US 12,499,750 B2
(45) Date of Patent: *Dec. 16, 2025

(54) FIRE DETERMINATION METHOD AND APPARATUS USING MULTIPLE WAVELENGTHS

(71) Applicant: ELECTRONICS AND TELECOMMUNICATIONS RESEARCH INSTITUTE, Daejeon (KR)

(72) Inventors: Hoe-Sung Yang, Daejeon (KR); Soocheol Kim, Daejeon (KR); Hyunseok Kim, Daejeon (KR); Jin Hwa Ryu, Daejeon (KR); So Yung Park, Daejeon (KR); Kang Bok Lee, Daejeon (KR); Yong Tae Lee, Daejeon (KR); Kwang-Soo Cho, Daejeon (KR); Kyu Won Han, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 100 days.

This patent is subject to a terminal disclaimer.

(21) Appl. No.: 18/540,288

(22) Filed: Dec. 14, 2023

(65) Prior Publication Data

US 2024/0233516 A1 Jul. 11, 2024

(30) Foreign Application Priority Data

Jan. 9, 2023 (KR) ........................ 10-2023-0002830

(51) Int. Cl.

| | |
|---|---|
| ***G08B 29/14*** | (2006.01) |
| ***G08B 17/107*** | (2006.01) |
| ***G08B 21/18*** | (2006.01) |

(52) U.S. Cl.

CPC ......... *G08B 29/145* (2013.01); *G08B 17/107* (2013.01); *G08B 21/182* (2013.01)

(58) Field of Classification Search

CPC ... G08B 29/145; G08B 17/107; G08B 21/182

(Continued)

(56) References Cited

U.S. PATENT DOCUMENTS

| | | | | |
|---|---|---|---|---|
| 5,959,589 A * | 9/1999 | Sadovnik | H01Q 25/00 343/765 |
| 6,218,950 B1 * | 4/2001 | Politze | G08B 17/107 340/630 |

(Continued)

FOREIGN PATENT DOCUMENTS

| | | |
|---|---|---|
| CN | 2914067 Y | 6/2007 |
| KR | 10-1963111 B1 | 7/2019 |

(Continued)

*Primary Examiner* — Zhen Y Wu

(57) ABSTRACT

The present invention is directed to reducing non-fire alarms by distinguishing between smoke caused by an actual fire and non-fire smoke generated in daily life when an event suspected to be a fire occurs. The present invention provides an apparatus and method for determining whether a fire occurs using a smoke detector, which includes a light emitter for generating multiple wavelengths, a light receiver configured to detect light scattered by particles of smoke, and a fire determiner for checking whether the strength of a signal of the detected scattered light exceeds a threshold and generating an alarm, to use characteristics of multiple wavelengths in a photoelectric fire detection apparatus. The fire determiner calculates normalized values by normalizing measured values for the scattered light, and calculates a singular value from the normalized values as a criterion for determining whether the smoke is caused by a fire or a non-fire.

11 Claims, 5 Drawing Sheets

(58) Field of Classification Search
USPC .......................................................... 340/630
See application file for complete search history.

(56) References Cited

U.S. PATENT DOCUMENTS

| | | | | |
|---|---|---|---|---|
| 9,098,989 | B2 * | 8/2015 | Fischer | G08B 17/107 |
| 11,002,675 | B2 * | 5/2021 | Erdtmann | G08B 17/107 |
| 2013/0234856 | A1 * | 9/2013 | Cole | G08B 17/107<br>340/630 |
| 2013/0238138 | A1 | 9/2013 | Cole et al. | |
| 2014/0169389 | A1 | 6/2014 | Kim et al. | |
| 2014/0178069 | A1 | 6/2014 | Kim et al. | |
| 2014/0197957 | A1 * | 7/2014 | Fischer | G08B 17/107<br>340/630 |
| 2020/0363312 | A1 | 11/2020 | Deliwala | |
| 2021/0123864 | A1 * | 4/2021 | Yang | G01N 21/31 |
| 2022/0099572 | A1 * | 3/2022 | Yu | G08B 29/185 |
| 2023/0108409 | A1 * | 4/2023 | Deliwala | G01N 21/255<br>382/128 |
| 2025/0071040 | A1 * | 2/2025 | Wang | G16Y 40/50 |

FOREIGN PATENT DOCUMENTS

| | | | |
|---|---|---|---|
| KR | 10-2021-0087909 | A | 7/2021 |
| KR | 10-2275994 | B1 | 7/2021 |
| KR | 10-2352201 | B1 | 1/2022 |

* cited by examiner

FIRE DETERMINATION METHOD AND APPARATUS USING MULTIPLE WAVELENGTHS

CROSS-REFERENCE TO RELATED APPLICATION

This application claims priority to and the benefit of Korean Patent Application No. 10-2023-0002830, filed on Jan. 9, 2023, the disclosure of which is incorporated herein by reference in its entirety.

BACKGROUND

1. Field of the Invention

The present invention relates to a technique for preventing non-fire alarm by determining whether an event suspected to be a fire is an actual fire or a non-fire when the event occurs and alarm.

2. Discussion of Related Art

A fire detector is a device that determines whether a fire occurs by detecting heat and smoke generated from the fire. Fire detectors are classified according to a heat detection method and a smoke detection method. Types of the heat detection method include a constant temperature method of detecting a fire when an ambient temperature of a detector exceeds a certain level, and a differential method performed when a temperature increase rate exceeds a threshold. Types of the smoke detection method include an ionization method of measuring a change in an ion current value due to smoke and a photoelectric method of detecting the scattering of light due to smoke particles.

Meanwhile, the use of photoelectric fire detectors has recently been increasing for rapid detection of a fire. Such a photoelectric fire detector is configured to generate a fire alarm by detecting whether the strength of a signal of light scattered by particles of smoke exceeds a threshold when the smoke enters a chamber inside the detector.

However, existing photoelectric fire detectors are likely to determine that a fire has occurred, even when particles other than smoke from a fire, such as cooking smoke, cigarette smoke, water vapor, and fine dust generated in daily life, are introduced, and generate a fire alarm, thus causing frequent generation of non-fire alarms.

Due to the frequent generation of non-fire alarms, i.e., false alarms, the waste of administrative power is caused when fire engines are dispatched erroneously and the general public may become indifferent even when an actual fire alarm occurs. Furthermore, there are even cases in which a fire detector is turned off to avoid false alarms, thus causing serious casualties and property damage when an actual fire occurs.

SUMMARY OF THE INVENTION

To address the above-described problems, the present invention is directed to preventing a non-fire alarm by distinguishing between smoke caused by an actual fire and non-fire smoke generated in daily life when an event suspected to be a fire occurs.

To solve the problems, the present invention provides a multi-wavelength-based fire determination method and apparatus for distinguishing between smoke caused by a fire and quasi-smoke caused by a non-fire using characteristics of multiple wavelengths in a photoelectric fire detection apparatus.

Specifically, an aspect of the present invention provides a fire determination method and apparatus using a smoke detector that includes a light emitter for generating multiple wavelengths, a light receiver for detecting light scattered by particles of smoke, and a fire determiner for detecting whether the strength of a signal of the detected scattered light exceeds a threshold and generating an alarm. The fire determiner may calculate normalized values by normalizing measured values for the scattered light, and calculate a singular value from the normalized values as a criterion for determining whether the smoke is caused by a fire or a non-fire.

Another aspect of the present invention provides a method of determining whether a fire occurs using a smoke detector that includes a light emitter for generating multiple wavelengths, a light receiver for detecting light scattered by particles of smoke, and a fire determiner for detecting whether the strength of a signal of the detected scattered light exceeds a threshold and generating an alarm, the method including: detecting, by a light receiver, light with multiple wavelengths, which is emitted from a light emitter and scattered by particles of smoke, to obtain a multi-wavelength signal; performing, by the fire determiner, normalization by receiving the signal of the scattered light and normalizing values measured at the multiple wavelengths of the scattered light to calculate normalized values; after the normalization, calculating, by the fire determiner, a singular value as a criterion for determining whether generated smoke is caused by a fire; determining, by the fire determiner, whether the sum of the normalized values for the scattered light reaches a preset threshold; and when the sum of the normalized values reaches the preset threshold, determining, by the fire determiner, whether the generated smoke is caused by a fire or a non-fire using the calculated singular value.

Other aspects of the present invention will be apparent from the detailed description and drawings.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF EXEMPLARY EMBODIMENTS

Hereinafter, embodiments of the present invention will be described in detail with reference to the accompanying drawings. The terminology used herein is for the purpose of describing embodiments of the present invention only and is not intended to limit the present invention. As used herein, singular forms are intended to include plural forms unless the context clearly indicates otherwise. As used herein, the terms "comprise" or "comprising" specify the presence of stated components, steps, operations and/or elements but do not preclude the presence or addition of one or more other components, steps, operations and/or elements.

First, the background of the present invention will be described to help the understanding of the present invention.

Figure 1A:
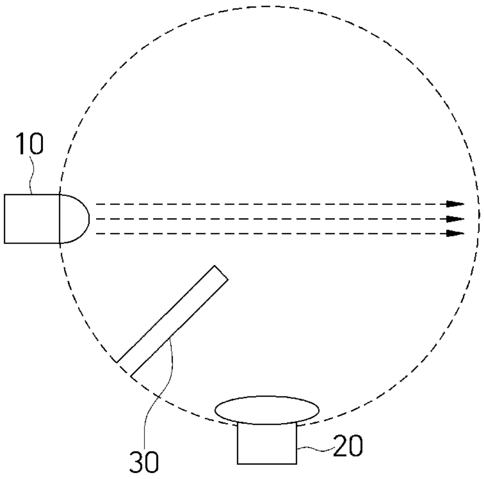
FIG. 1A is a diagram for briefly describing the principles of a photoelectric fire detector of the related art.
Figure 1B:
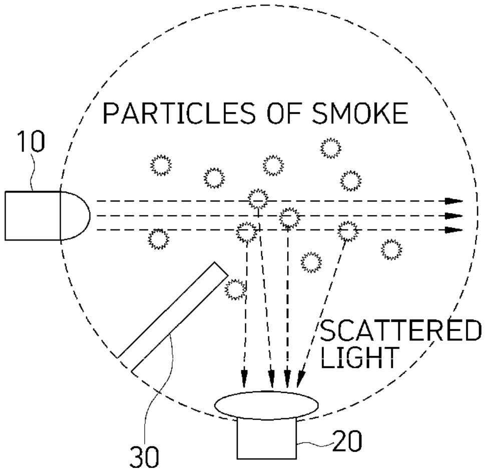
FIG. 1B is a diagram for briefly describing an operation of the photoelectric fire detector of the related art when smoke particles enter it.

FIG. 1A is a diagram for briefly describing a photoelectric fire detector of the related art. FIG. 1B is a diagram for describing an operation of the photoelectric fire detector when smoke particles enter it.

Referring to FIG. 1A, the photoelectric fire detector includes a light emitter 10 including a light-emitting diode (LED) or a laser, and a light receiver 20 including a photodetector such as a photodiode (PD). It has a structure in which, in a chamber, the light emitter 10 and the light receiver 20 may be unaligned by a certain angle with each other or a light-blocking wall 30 may be installed. Therefore, in a general environment that smoke particles are not introduced, the light emitted from the light emitter 10 may not be detected by the light receiver 20.

FIG. 1B illustrates a case in which particles of the smoke are introduced into the chamber of the photoelectric fire detector, and when light emitted from the light emitter 10 and scattered by the particles of the smoke is incident on the light receiver 20, the light receiver 20 responds to the scattered light. That is, the scattered light due to the smoke is detected by a light-receiving element of the light receiver 20, and an alarm is generated when the strength of a detected signal increases gradually and exceeds a threshold set for the generation of the alarm.

The photoelectric fire detector of the related art responds to particles that are in an aerosol form and thus responds to not only smoke due to a fire but also cooking smoke, cigarette smoke, vapor, fine dust, etc. generated in daily life, thus causing frequent generation of non-fire alarms.

To address this problem, the present invention is directed to distinguishing between smoke due to a fire and quasi-smoke due to a non-fire using the photoelectric fire detector and multiple wavelength characteristics.

Figure 2:
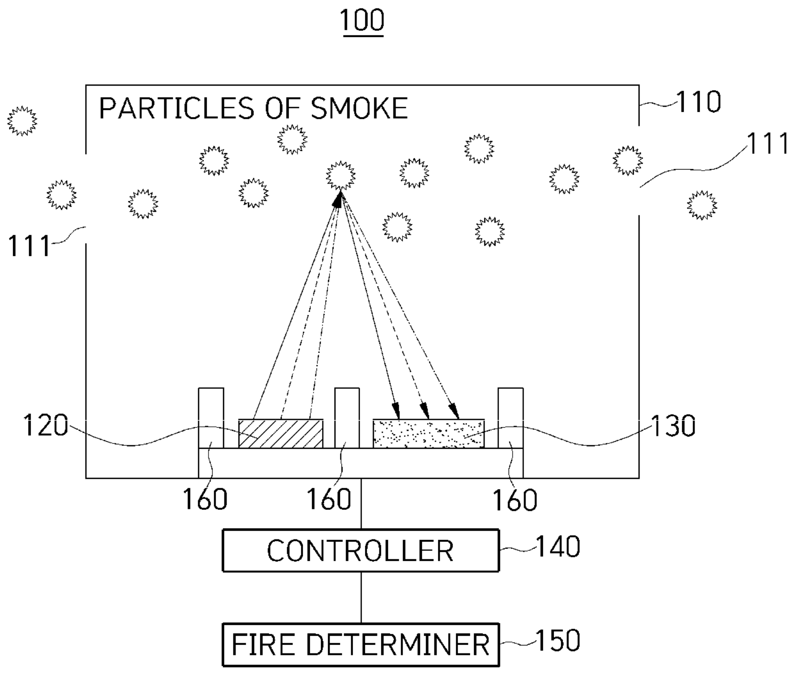
FIG. 2 illustrates an example of a multi-wavelength photoelectric smoke detector employed in the present invention.

FIG. 2 illustrates an example of a multi-wavelength photoelectric smoke detector 100 usable in a method of determining whether a fire occurs using multiple wavelengths according to the present invention.

The multi-wavelength photoelectric smoke detector 100 includes a chamber 110 with a smoke inlet 111; a light emitter 120 that generates a plurality of wavelengths; a light receiver 130 that detects scattered light due to smoke particles; a controller 140 that causes a light source of the light emitter 120 to flicker and detects a signal of the scattered light from the light receiver 130; and a fire determiner 150 that checks whether the strength of the detected signal of the scattered light exceeds a threshold and generates an alarm. A light-blocking wall 160 may be provided to prevent light from being directly transmitted between the light emitter 120 and the light receiver 130 and surround the light emitter 120 and the light receiver 130 to block interference of external light.

In FIG. 2, the controller 140 and the fire determiner 150 are shown separately for description of functions but may be integrated in one physical region when actually implemented. For example, the controller 140 and the fire determiner 150 may be implemented with a processor based on computer hardware and software, a microcomputer, etc.

In an embodiment, the number n of wavelengths of light emitted from the light emitter 120 that emits a plurality of wavelengths may be four, and the four wavelengths may include a first wavelength λ1=about 450 nm±50 nm, a second wavelength λ2=about 550 nm±50 nm, a third wavelength λ3=about 650 nm±50 nm, and a fourth wavelength λ4=about 950 nm±50 nm. A photodiode PD of the light receiver 130 is capable of receiving light of wavelengths of about 400 nm to 1000 nm to detect n wavelengths, and may include a plurality of photodiodes (e.g., n photodiodes) to cover broadband wavelengths in some cases.

To emit multiple wavelengths, the light emitter 120 may include either n independent LED products or one or several LED products in which n or fewer light-emitting chips are integrated in one LED mold.

A method of identifying whether an event suspected to be a fire is a non-fire using the multi-wavelength photoelectric smoke detector 100 described above according to the present invention will be described below. It will be hereinafter assumed for convenience of description that the number n of wavelengths is four.

Figure 3A:
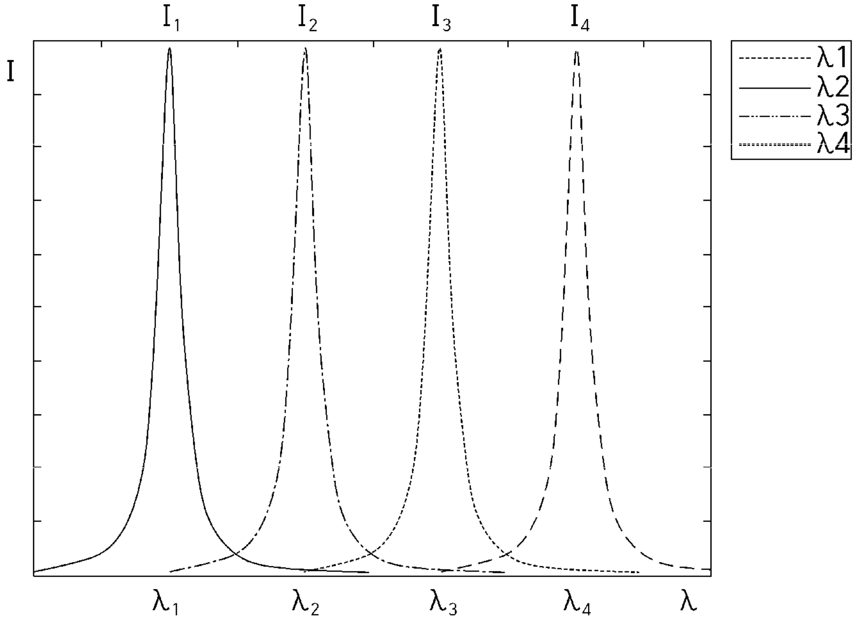
FIGS. 3A and 3B are diagrams illustrating examples of an emission wavelength and a normalization value of a multi-wavelength light emitter of the multi-wavelength photoelectric smoke detector of FIG. 2.
Figure 3B:
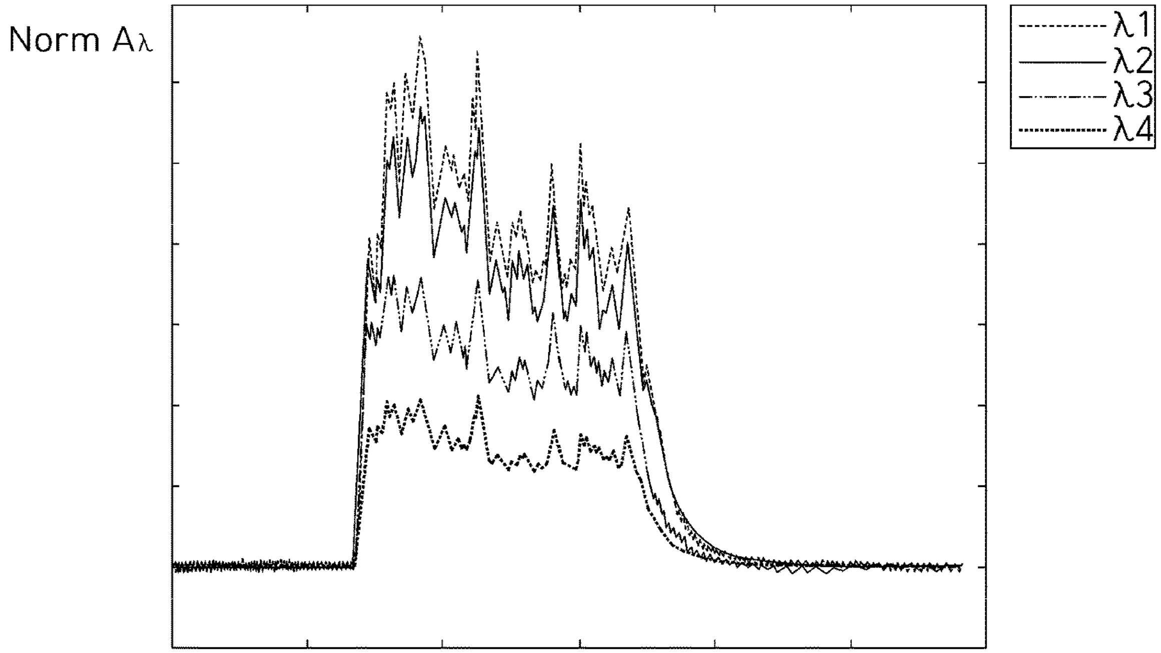

FIG. 3A is a graph showing outputs of n light-emitting sources (n=4) of the light emitter 120 with respect to a signal strength I (left) and FIG. 3B shows normalized values Norm A_λ for each wavelength. FIG. 3A represents signal strengths of four wavelengths, and FIG. 3B represents four normalized values Norm A_λ calculated by normalizing four measured values obtained by the light receiver 130 detecting scattered light for each wavelength. The normalized values Norm A_λ are obtained by the light receiver 130 normalizing values measured for light, which is scattered by smoke particles, on the basis of a value measured by the light receiver 130 in a state in which there are no smoke particles.

The normalized values Norm A_λ may be expressed by Equation 1 below.

$$Norm\ A_\lambda = \begin{bmatrix} Norm\ A_1 \\ Norm\ A_2 \\ Norm\ A_3 \\ Norm\ A_4 \end{bmatrix} \quad \text{[Equation 1]}$$

Figure 4:
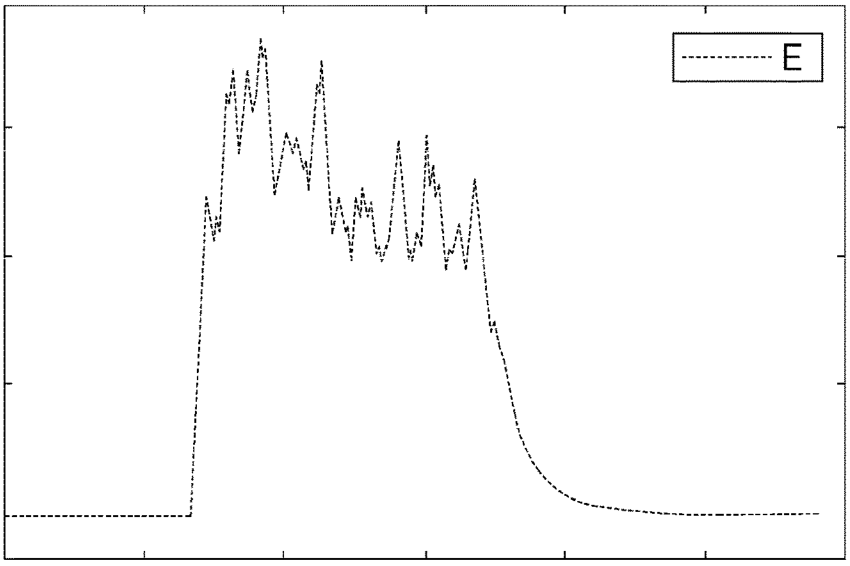
FIG. 4 is a diagram illustrating a value E.

A value E that is the sum of Norm $A_1$, Norm $A_2$, Norm $A_3$, and Norm $A_4$ may be expressed by Equation 2 below. The value E is illustrated in FIG. 4. The value E that is the sum of the n normalized values Norm A_λ (n=4) for the scattered light is compared with a threshold to determine whether an event suspected to be a fire has occurred.

[Equation 2]

$$E = \sum_{\lambda=1}^{4} Norm\ A_\lambda = Norm\ A_1 + Norm\ A_2 + Norm\ A_3 + Norm\ A_4$$

However, whether an event suspected to be a fire occurs due to particles of smoke introduced into a chamber may be determined according to the normalized values Norm A_λ of Equation 1 and the value E of Equation 2, but whether the smoke has been caused by a fire or another cause cannot be determined. Accordingly, the present invention provides a mathematical algorithm for deriving a singular value for distinguishing between a fire and a non-fire on the basis of Equation 1.

In Equation 3, $d_{ij}$ denotes a difference between the elements of Equation 1 above, and D denotes differences $d_{ij}$ between the elements, which are arranged in a matrix.

$$D = \begin{bmatrix} d_{11} & d_{12} & d_{13} & d_{14} \\ d_{21} & d_{22} & d_{23} & d_{24} \\ d_{31} & d_{32} & d_{33} & d_{34} \\ d_{41} & d_{42} & d_{43} & d_{44} \end{bmatrix} \quad \text{[Equation 3]}$$

Here, $d_{ij} = |Norm\ A_i - Norm\ A_j|\ i, j = 1, 2, 3, 4.$

In Equation 3 above, $d_{ij}$ denotes a distance corresponding to a correlation (similarity) between the elements of Equation 1. That is, a matrix D (first matrix) consists of n×n elements $d_{ij}$ representing the similarity between the n normalized values Norm A_λ for the scattered light.

Equation 4 represents a matrix S (second matrix) consisting of $s_{ij}$ as elements calculated from the elements of the matrix D calculated in Equation 3 for the four wavelengths (n=4).

$$S = \begin{bmatrix} s_{11} & s_{12} & s_{13} & s_{14} \\ s_{21} & s_{22} & s_{23} & s_{24} \\ s_{31} & s_{32} & s_{33} & s_{34} \\ s_{41} & s_{42} & s_{43} & s_{44} \end{bmatrix} \quad \text{[Equation 4]}$$

$$\text{Here, } s_{ij} = -\frac{1}{2}\left[d_{ij}^2 - \frac{1}{n}\sum_{q=1}^{n} d_{iq}^2 - \frac{1}{n}\sum_{p=1}^{n} d_{pj}^2 + \frac{1}{n^2}\sum_{g=1}^{n}\sum_{h=1}^{n} d_{gh}^2\right].$$

The matrix S of Equation 4 above is a matrix consisting of $s_{ij}$ as elements calculated from the elements of the matrix D calculated in Equation 3 for the four wavelengths (n=4). When interpreted broadly, the matrix S may be defined as a matrix for deriving an optimum distribution of the elements $d_{ij}$ of the matrix D from a combination of the elements $d_{ij}$ of the matrix D for each of the wavelengths.

Equation 5 represents an eigenvector v for the matrix S of Equation 4.

$$Sv = \lambda v \quad \text{[Equation 5]}$$

In Equation 5 above, λ denotes an eigenvalue of the matrix S of Equation 4 above, and v denotes an eigenvector of the eigenvalue λ of the matrix S. That is, for the matrix S, which is an n×n square matrix, a column vector v that satisfies Sv=λv and is not zero is defined as an eigenvector and a constant λ is defined as an eigenvalue.

The eigenvector may be represented by a matrix consisting of four elements $v_1$, $v_2$, $v_3$ and $v_4$ classified according to four wavelengths as shown in Equation 6 below. The mathematical definitions of the eigenvalue and the eigenvector are widely known from linear algebra and thus a detailed description thereof will be omitted here.

$$v = \begin{bmatrix} v_1 \\ v_2 \\ v_3 \\ v_4 \end{bmatrix} \quad \text{[Equation 6]}$$

Figure 5:
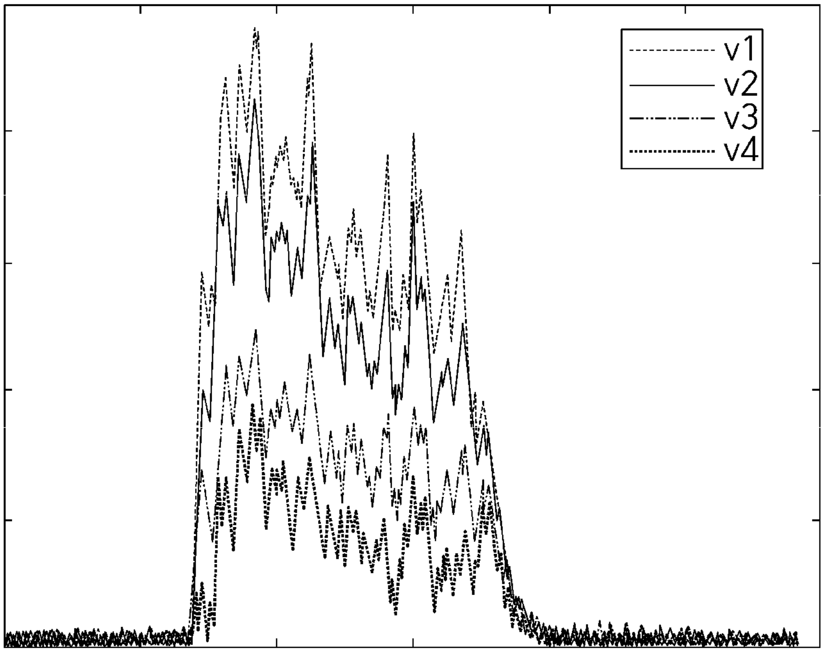
FIG. 5 is a diagram illustrating a singular value derived from a normalized value of FIG. 3B.

FIG. 5 shows the elements (singular values) of the eigenvector of Equation 6 calculated from the normalization signals of FIG. 3B in Equations 3, 4 and 5. The singular values of the present invention may be understood to mean eigenvectors $v_1$, $v_2$, $v_3$ and $v_4$ as shown in the graph of FIG. 5. Here, scattered light measured at each of four wavelengths is described as an example, in which four eigenvectors are calculated. Therefore, n eigenvectors will be calculated in the case of scattered light measured at each of n wavelengths.

Figure 6A:
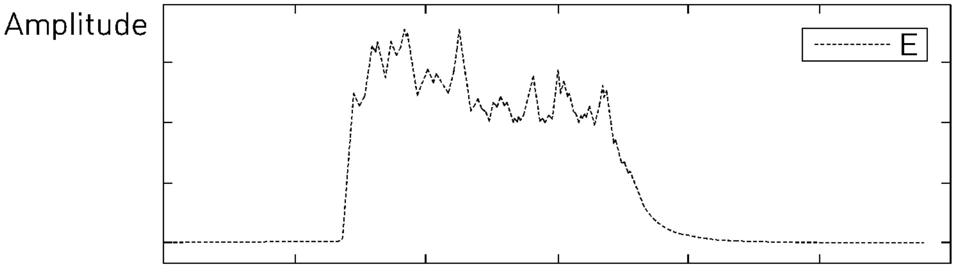
FIGS. 6A and 6B are diagrams each illustrating showing an amplitude of the value E of FIG. 4 and degrees of angle.
Figure 6B:
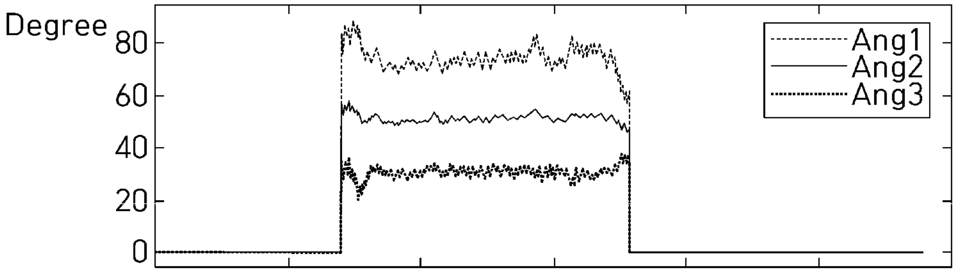

A fire determination conditional expression may be obtained from a combination of the elements, which are the singular values, i.e., the eigenvectors v1, v2, v3, and v4, to distinguish between a fire and a non-fire. For example, an angle Ang formed by a ratio between the singular values may be obtained as follows. In Equation 7 below, Ang1, Ang2, and Ang3 that are angles representing the ratio between the eigenvectors v1, v2, v3, and v4 may be represented by the graph of FIGS. 6A and 6B. FIG. 6A shows an amplitude of the value E of FIG. 4 and FIG. 6B shows degrees of angle calculated in Equations 7 to 9.

$$Ang1 = \tan^{-1}\left(\frac{v_4}{v_1}\right), \quad \text{[Equation 7]}$$

$$Ang2 = \tan^{-1}\left(\frac{v_4}{v_3}\right), \quad \text{[Equation 8]}$$

$$Ang3 = \tan^{-1}\left(\frac{v_2}{v_1}\right). \quad \text{[Equation 9]}$$

As described above, a fire determination condition equation using singular values is not limited to Equation 7 and may be derived from various combinations of the singular values of Equation 6. For example, whether a fire occurs may be determined, by summing or multiplying all the singular values v1, v2, v3, and v4 and then comparing the summed or multiplied value with a threshold. Alternatively, a similarity between the singular values v1, v2, v3, and v4 may be calculated and compared with a threshold to determine whether a fire occurs. Alternatively, the difference between the singular values v1, v2, v3, and v4 may be compared with a threshold to determine whether a fire occurs. Alternatively, a mean between the singular values v1, v2, v3, and v4 may be compared with a threshold to determine whether a fire occurs.

Figure 7:
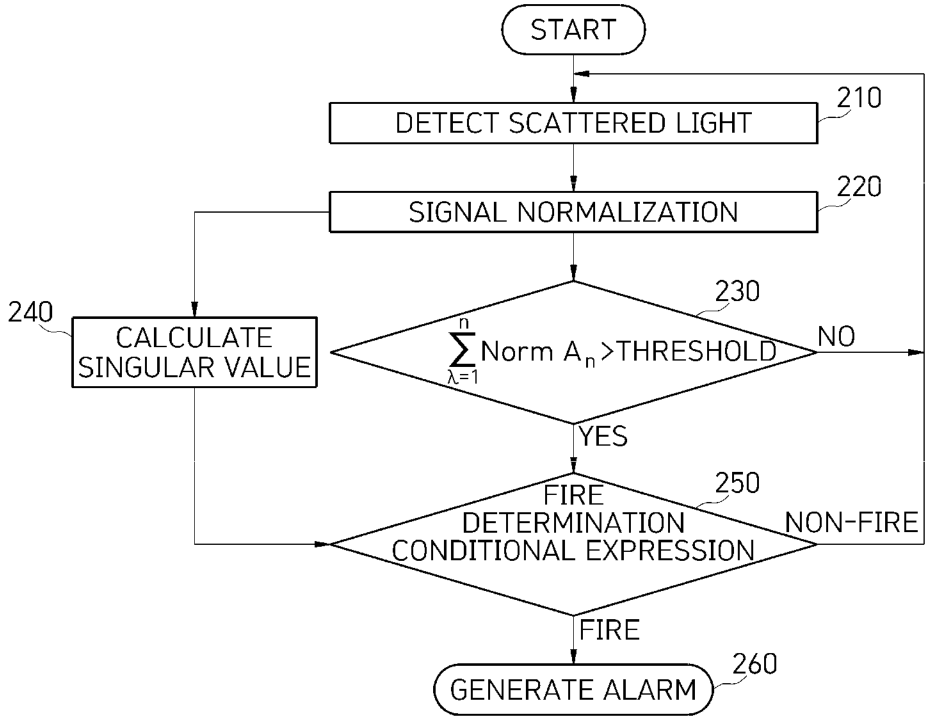
FIG. 7 is a flowchart of a multi-wavelength photoelectric fire detection method according to the present invention.

FIG. 7 is a flowchart of a process of a fire detection method according to the present invention, in which a singular value is derived with respect to a signal of scattered light detected by the multi-wavelength photoelectric fire detector shown in FIG. 2 to distinguish between a fire and a non-fire. The process is performed in the same order as described above principle of the present invention, and will be briefly described here. As described above, the process of FIG. 7 may be performed on a hardware and software basis by a computer-based processor implemented as the controller 140 or/and the fire determiner 150 of FIG. 2.

First, a signal of scattered light is detected (210). The detection of the signal of the scattered light is a process in which the light receiver 130 detects light with n wavelengths that is emitted from the light emitter 120 and scattered by particles of smoke to obtain n wavelength signals and these signals are received by the processor.

Next, the processor performs normalization on the detected signal of the scattered light (220). The normalization is a process of normalizing values measured at the n wavelengths of the scattered light to calculate normalization values Norm A_λ (see the above description related to Equation 1).

Next, the processor determines whether a value (the value E in Equation 2) that is the sum of the n normalized values Norm A_λ for the scattered light exceeds a preset threshold (230). Operation 230 is performed to determine whether an event suspected to be a fire has occurred.

Meanwhile, apart from operation 230, the processor calculates a singular value as described above after the normalization in operation 220 (240). The singular value is calculated from Equations 3 to 6 as described above with reference to FIG. 5. In the present invention, the singular value is a criterion for determining whether generated smoke is caused by a fire.

When it is determined in operation 230 that an event suspected to be a fire has occurred, the processor determines whether the event is a fire or a non-fire by applying the calculated singular value, Equation 7 above, and the fire determination conditional expression described above with reference to FIGS. 6A and 6B (250).

When it is determined that smoke introduced into a chamber is caused by a fire, a fire alarm is issued (260). Here, the fire alarm may be output as visual or/and auditory information.

Figure 8:
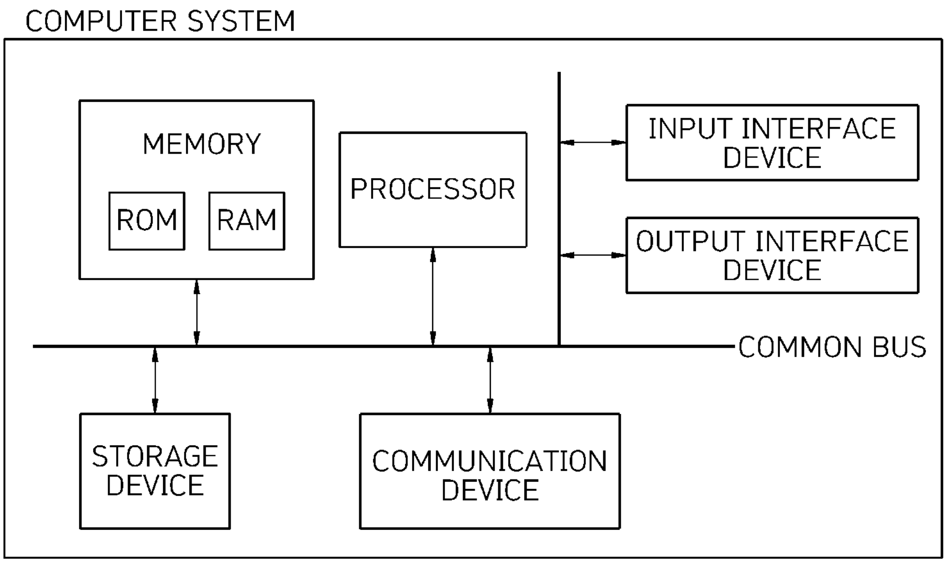
FIG. 8 is a block diagram of a computer system that is a basis of a processor and a software algorithm of the present invention.

The processor and the software algorithm of the present invention described above may be implemented based on the computer system illustrated in FIG. 8.

The computer system of FIG. 8 may include at least one of a processor, a memory, an input interface device, an output interface device, and a storage device that communicate with one another through a common bus. The computer system may further include a communication device connected to a network. The processor may be a central processing unit (CPU) or a semiconductor device that executes a command stored in a memory or a storage device. The communication device may transmit or receive a wired signal or a wireless signal. The memory and the storage device may include various types of volatile or nonvolatile storage media. The memory may include a read-only memory (ROM) and a random access memory (RAM). The memory may be located inside or outside the processor and connected to the processor through any of various well-known means.

Accordingly, the present invention may be implemented by a method implemented by a computer or may be implemented as a non-transitory computer-readable medium in which a computer executable instruction is stored. In an embodiment, a method according to at least one embodiment may be performed when the computer executable instruction is executed by the processor.

Methods according to the present invention may be embodied as program instructions executable through various computer means and recorded on a computer-readable recording medium. The computer-readable medium may include program instructions, data files, data structures, etc. solely or in combination. The program instructions recorded on the computer-readable recording medium may be specially designed and configured for embodiments of the present invention or may be known and available to those of ordinary skill in the field of computer software. The computer-readable recording medium may include a hardware device configured to store and perform program instructions. Examples of the computer-readable recording medium include magnetic media such as hard disks, floppy disks, and magnetic tapes, optical media such as CD-ROMs and DVDs, magneto-optical media such as floptical disks, ROMs, RAMs, flash memories, and the like. Examples of the program instructions include not only machine language code generated by a compiler but also high-level language code executable by a computer using an interpreter or the like.

According to the present invention, when an event suspected to be a fire is detected by a photoelectric fire detection device, whether the event is a fire or a non-fire can be identified to reduce the occurrence of false fire alarms due to smoke caused by daily life, thereby preventing erroneous dispatch of firefighters in advance and increasing general people's confidence in a fire alarm.

Embodiments in which the idea of the present invention is specifically implemented have been described above. However, the technical scope of the present invention is not limited to the embodiments and drawings described above but should be determined by a reasonable interpretation of the following claims.

What is claimed is:

1. A method of determining whether a fire occurs using a smoke detector that includes a light emitter for generating multiple wavelengths, a light receiver for detecting light scattered by particles of smoke, and a fire determiner for detecting whether the strength of a signal of the detected scattered light exceeds a threshold and generating an alarm, the method comprising:

normalizing, by the fire determiner, measurement values for the scattered light based on a reference value measured by the light receiver in a state without smoke particles, to generate normalized values; and calculating, by the fire determiner, a singular value from the normalized values, the singular value being a criterion for determining whether the smoke is caused by a fire or a non-fire, wherein the calculating of the singular value comprises:

calculating a first matrix (D) including elements representing a similarity between the normalized values;

calculating a second matrix(S) for deriving a distribution of the elements of the first matrix (D) at each wavelength; and calculating eigenvectors of the second matrix(S), the singular value including the eigenvectors.

2. The method of claim 1, further comprising calculating a sum of the normalized values for the scattered light.

3. The method of claim 1, further comprising:

converting a ratio between the eigenvectors into degrees of angle; and determining whether the light scattered by the particles of the smoke is caused by a fire or a non-fire on the basis of a relationship between the degrees of angle.

4. The method of claim 1, further comprising generating, by the fire determiner, a fire determination conditional expression from degrees of angle formed by the eigenvectors of the singular value to distinguish between a fire and a non-fire.

5. A method of determining whether a fire occurs using a smoke detector that includes a light emitter for generating multiple wavelengths, a light receiver for detecting light scattered by particles of smoke, and a fire determiner for detecting whether the strength of a signal of the detected scattered light exceeds a threshold and generating an alarm, the method comprising:

detecting, by the light receiver, light with multiple wavelengths, which is emitted from the light emitter and scattered by particles of smoke, to obtain a multi-wavelength signal;

by the fire determiner, receiving the signal of the scattered light and normalizing values measured at the multiple wavelengths of the scattered light based on a reference value measured by the light receiver in a state without smoke particles, to generate normalized values;

calculating, by the fire determiner, a sum of the normalized values for the scattered light;

after the normalization, calculating, by the fire determiner, a singular value as a criterion for determining whether generated smoke is caused by a fire or a non-fire;

determining, by the fire determiner, whether the sum of the normalized values for the scattered light reaches a preset threshold; and when the sum of the normalized values reaches the preset threshold, determining, by the fire determiner, whether the generated smoke is caused by a fire or a non-fire using the calculated singular value, wherein the calculating of the singular value comprises:

calculating a first matrix (D) including elements representing a similarity between the normalized values;

calculating a second matrix(S) for deriving a distribution of the elements of the first matrix (D) at each wavelength; and calculating eigenvectors of the second matrix(S), the singular value including the eigenvectors.

6. The method of claim 5, further comprising:

converting a ratio between the eigenvectors into degrees of angle; and determining whether the light scattered by the particles of the smoke is caused by a fire or a non-fire on the basis of a relationship between the degrees of angle.

7. The method of claim 5, further comprising generating, by the fire determiner, a fire determination conditional expression from degrees of angle formed by the eigenvectors of the singular value to distinguish between a fire and a non-fire.

8. An apparatus for determining whether a fire occurs using multiple wavelengths, comprising:

a light emitter configured to generate multiple wavelengths;

a light receiver configured to detect light scattered by particles of smoke; and a fire determiner configured to check whether strength of a signal of the detected scattered light exceeds a threshold and generate an alarm, wherein the fire determiner is further configured to:

normalize measured values for the scattered light based on a reference value measured by the light receiver in a state without smoke particles, to generate normalized values; and calculate a singular value from the normalized values, the singular value being a criterion for determining whether the smoke is caused by a fire or a non-fire, wherein, in order to calculate the singular value, the fire determiner is further configured to:

calculate a first matrix (D) including elements representing a similarity between the normalized values; and calculate a second matrix(S) for deriving a distribution of the elements of the first matrix (D) at each wavelength; and calculate eigenvectors of the second matrix(S), the singular value including the eigenvectors.

9. The apparatus of claim 8, wherein the fire determiner is further configured to calculate a sum of the normalized values for the scattered light.

10. The apparatus of claim 8, wherein the fire determiner is further configured to:

convert a ratio between the eigenvectors into degrees of angles; and determine whether the light scattered by the particles of the smoke is caused by a fire or a non-fire on the basis of a relationship between the degrees of angle.

11. The apparatus of claim 8, wherein the fire determiner is further configured to generate a fire determination conditional expression from degrees of angle formed by the eigenvectors of the singular value to distinguish between a fire and a non-fire.

* * * * *